(No Model.)
W. L. PARKER.
Low Water Indicator.
No. 239,980.                    Patented April 12, 1881.
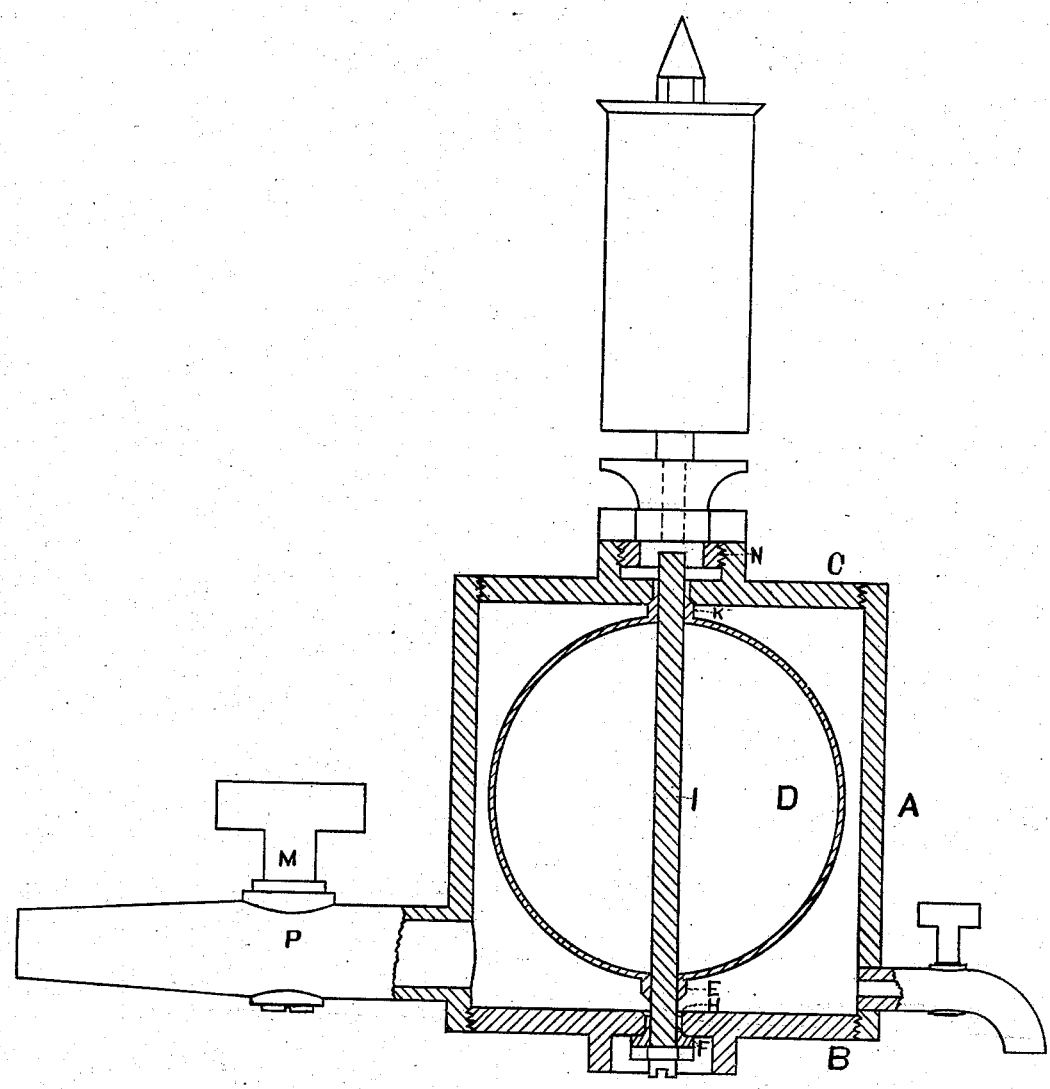
Witnesses
Franc W. Parker
O. V. Stookey.
Inventor
W. L. Parker.

UNITED STATES PATENT OFFICE.

WASHINGTON L. PARKER, OF CHICAGO, ILLINOIS.

LOW-WATER INDICATOR.

SPECIFICATION forming part of Letters Patent No. 239,930, dated April 12, 1881.

Application filed December 31, 1880. (No model.)

*To all whom it may concern:*

Be it known that I, WASHINGTON LEROY PARKER, of Chicago, Illinois, have invented a new and useful Low-Water Indicator,(which has never been patented or known or used in this or any other country prior to this time,) of which the following is a specification.

My invention is a low-water indicator, and has for its object the sounding of an alarm when the water in a steam-boiler has sunk below a line considered as the line of danger. This object I attain by the mechanism substantially illustrated in the accompanying drawing, which is made a part of this specification.

A is a hollow cylinder, having the plugs B and C screwed into its lower and upper ends, respectively.

D is a float inside the cylinder A, having the valve K at its upper end and the valve E at its lower end adjusted to the valve-seat H.

I is a valve-stem passing through and screwing into the float D, and also the valve F, adjusted to a valve-seat in the under part of B.

L is an opening connecting the hollow cylinder with a whistle connected with C at the point N.

M is a valve regulating the connection of the cylinder, through the pipe P, with the steam-boiler.

Suppose a mechanism, as illustrated in the drawing, be connected with a steam-boiler, so that the end of the connecting-pipe inside the boiler shall be at the line lower than which the water in the boiler cannot safely be allowed to fall. Then, so long as the water is above this line, the pressure of the steam will pass the water through the pipe and keep the cylinder full of water, thereby keeping the float in the position indicated in the drawing, with both upper and lower valves closed; but should the water fall below the line indicated the steam would immediately fill the pipe and the cylinder, the float would fall, at the same time opening the upper valve and allowing the steam to pass into the whistle and sound the alarm, and closing the lower valve, so that all the steam would be passed into the whistle.

It will be observed that the indicator may be attached to any desirable part of the boiler, that any suitable whistle or method of alarm may be used, and that the whole may be made of any suitable materials.

What I claim as my invention, and desire to secure by Letters Patent, is—

In a low-water indicator, the cylinder A, with the plugs B and C and inside floating balance-valve, combined with the alarm, connected at N and by the pipe P with the inside of the boiler, all constructed and arranged as shown, and for the purpose described.

WASHINGTON LEROY PARKER.

Witnesses:
FRANC W. PARKER,
GEORGE W. WOODBURY.